(12) United States Patent
Davis et al.

(10) Patent No.: US 11,740,897 B2
(45) Date of Patent: Aug. 29, 2023

(54) METHODS FOR SOFTWARE DEVELOPMENT AND OPERATION PROCESS ANALYTICS AND DEVICES THEREOF

(71) Applicant: Copado, Inc., Chicago, IL (US)

(72) Inventors: Andrew Davis, San Diego, CA (US); Gloria Ramchandani, Alpharetta, GA (US); Mert Yalti, Madrid (ES)

(73) Assignee: Copado, Inc., Chicago, IL (US)

( * ) Notice: Subject to any disclaimer, the term of this patent is extended or adjusted under 35 U.S.C. 154(b) by 0 days.

(21) Appl. No.: 17/376,749

(22) Filed: Jul. 15, 2021

(65) Prior Publication Data

US 2022/0019427 A1    Jan. 20, 2022

Related U.S. Application Data

(60) Provisional application No. 63/052,183, filed on Jul. 15, 2020.

(51) Int. Cl.
    *G06F 8/77*    (2018.01)
    *G06F 16/25*   (2019.01)
    *G06F 8/71*    (2018.01)

(52) U.S. Cl.
    CPC ............. *G06F 8/77* (2013.01); *G06F 16/254* (2019.01); *G06F 8/71* (2013.01)

(58) Field of Classification Search
    CPC ............. G06F 8/71; G06F 8/77; G06F 16/254
    (Continued)

(56) References Cited

U.S. PATENT DOCUMENTS

| 6,400,366 B1 | 6/2002 | Davies et al. |
| 6,995,768 B2 | 2/2006 | Jou et al. |

(Continued)

FOREIGN PATENT DOCUMENTS

| CN | 109087004 B | 4/2021 |
| WO | 2014138271 A2 | 9/2014 |
| WO | 2018006097 A1 | 1/2018 |

OTHER PUBLICATIONS

Mittal, Megha, et al., Process Mining Software Repositories from Student Projects in an Undergraduate Software Engineering Course, Companion Proceedings of the 36th International Conference on Software Engineering, May 2014, 10 pages, [retrieved on Mar. 20, 2023], Retrieved from the Internet: <URL:http://dl.acm.org/>.*

(Continued)

*Primary Examiner* — Geoffrey R St Leger
(74) *Attorney, Agent, or Firm* — Thompson Coburn LLP; Benjamin L. Volk, Jr.

(57) ABSTRACT

Methods, non-transitory computer readable media, and computing devices are disclosed that provision an analytics application in an instance of a software development platform. The analytics application comprises a schema, one or more functions, and one or more dashboard templates. Raw analytics data is extracted according to the schema. The raw analytics data is logged by the software development platform in one or more databases and is based on monitored activity associated with a software development process performed on the software development platform. The one or more functions are then applied to the extracted raw analytics data to generate performance metrics for the software development process. The one or more dashboard templates are populated based on the performance metrics and the populated one or more dashboard templates are (Continued)

embedded into a user interface of the software development platform to facilitate visualization of the raw analytics data.

18 Claims, 12 Drawing Sheets

(58) Field of Classification Search
USPC .......................................................... 717/170
See application file for complete search history.

(56) References Cited

U.S. PATENT DOCUMENTS

| | | | |
|---|---|---|---|
| 8,321,806 B2 | 11/2012 | Agrusa et al. | |
| 8,363,048 B2 | 1/2013 | Gering | |
| RE44,188 E | 4/2013 | Adra | |
| 8,669,994 B2 | 3/2014 | Cardno et al. | |
| 9,459,839 B2 | 10/2016 | Kisynski et al. | |
| 10,026,045 B1* | 7/2018 | Portnoy | G06Q 10/0639 |
| 10,819,593 B1* | 10/2020 | Parthasarathy | H04L 41/0686 |
| 2002/0091990 A1 | 7/2002 | Little et al. | |
| 2004/0039625 A1 | 2/2004 | Malnack et al. | |
| 2004/0162745 A1 | 8/2004 | Rodrigue et al. | |
| 2005/0234766 A1 | 10/2005 | Shuker | |
| 2006/0080157 A1 | 4/2006 | Shuker | |
| 2006/0085237 A1 | 4/2006 | Shuker et al. | |
| 2006/0242005 A1 | 10/2006 | Rodrigue et al. | |
| 2007/0078531 A1 | 4/2007 | Adra | |
| 2007/0203768 A1 | 8/2007 | Adra | |
| 2008/0095433 A1 | 4/2008 | Johnson et al. | |
| 2008/0195433 A1 | 8/2008 | Glenn et al. | |
| 2009/0031598 A1 | 2/2009 | Soni et al. | |
| 2011/0320228 A1 | 12/2011 | Kowalski | |
| 2012/0215829 A1 | 8/2012 | Naphade et al. | |
| 2012/0331439 A1* | 12/2012 | Zimmermann | G06F 8/77 717/101 |
| 2013/0018696 A1 | 1/2013 | Meldrum | |
| 2013/0311968 A1 | 11/2013 | Sharma | |
| 2014/0101091 A1 | 4/2014 | Brown et al. | |
| 2014/0365266 A1 | 12/2014 | Sethi et al. | |
| 2015/0134796 A1 | 5/2015 | Theimer et al. | |
| 2015/0195404 A1 | 7/2015 | O'Connor et al. | |
| 2018/0096372 A1 | 4/2018 | Rickard, Jr. et al. | |
| 2018/0374051 A1 | 12/2018 | Li et al. | |
| 2019/0026663 A1 | 1/2019 | Homeyer et al. | |
| 2020/0334269 A1* | 10/2020 | Chowdhury | G06F 16/116 |
| 2021/0149771 A1 | 5/2021 | Wilcock et al. | |

OTHER PUBLICATIONS

Stroulia, Eleni, et al., Interactive Exploration of Collaborative Software-Development Data, IEEE International Conference on Software Maintenance, Sep. 22-28, 2013, 4 pages, [retrieved on Mar. 20, 2023], Retrieved from the Internet: <URL:http://ieeexplore.ieee.org/>.*

Goff, "What is Software Usage Analytics?", Revenera, Sep. 12, 2019, entire document, retrieved form the internet on Sep. 20, 2021, https://www.revenera.com/blog/software-monetization/what-is-software-usage-analytics/.

International Search Report and Written Opinion for PCT/US2021/041830 dated Oct. 21, 2021.

Joshi, "Automating Value Stream Mapping in Lean Environment by Using RFID Tool", International Journal of Applied Research & Studies, Nov. 2012, entire document, retrieved on Sep. 27, 2021, https://www.hgsitabuilder.com/files/writeable/uploads/hostgator427959/file/ijars181.pdf.

MTZ, "Process Analysis, Programming, and Software Development", Sourcecodematrix, Jan. 23, 2013, entire document, retrieved form the internet on Sep. 20, 2021, https://sourcecodematrix.wordpress.com/2013/01/23/process-analysis-programming-and-software-development/.

Nightingale et al., "Enterprise Strategic Analysis and Transformation", Massachusetts Institute of Technology, 2008, pp. 1-87 (https://dspace.mit.edu/bitstream/handle/1721.1/81907/ESAT_2.0.pdf?sequence=1).

* cited by examiner

FIG. 8B

METHODS FOR SOFTWARE DEVELOPMENT AND OPERATION PROCESS ANALYTICS AND DEVICES THEREOF

This application claims the benefit of U.S. Provisional Patent Application Ser. No. 63/052,183, filed Jul. 15, 2020, which is hereby incorporated by reference in its entirety.

FIELD

This technology generally relates to software development analytics and, more specifically, to methods and devices for software development and operation process analytics, metrics, and embedded visualizations associated with the software development lifecycle.

BACKGROUND

Software development platforms, including the Salesforce™ platform, can facilitate generation of software applications through the software development lifecycle, as well as generate metadata associated with the software development. The metadata can include source code repository data (e.g., check in/out details, bug fix details, etc.), continuous delivery or continuous deployment (CI/CD) data, and other types of metadata that is maintained in database(s) on the platform. Often, many disparate systems are involved in the software development lifecycle, each maintaining metadata relating to aspects of software development processes for an organization identifier in various databases.

However, this metadata is not currently accessible in a visual form that facilitates gaining deeper insight into work distribution, efficiency, quality, etc. related to the software development process. Accordingly, users involved in the software development lifecycle at an organization are unable to conveniently access analytics and metrics relating to software development in a visual way that would yield insights and improvements to current and future software development processes.

SUMMARY

A method for providing software development analytics is disclosed. The method is implemented by an analytics apparatus and comprises provisioning an analytics application in an instance of a software development platform. The analytics application comprises a schema, one or more functions, and one or more dashboard templates. Raw analytics data is extracted according to the schema. The raw analytics data is logged by the software development platform in one or more databases and is based on monitored activity associated with a software development process performed on the software development platform. The one or more functions are then applied to the extracted raw analytics data to generate performance metrics for the software development process. The one or more dashboard templates are populated based on the performance metrics and the populated one or more dashboard templates are embedded into a user interface of the software development platform to facilitate visualization of the raw analytics data.

A non-transitory computer readable medium is disclosed that has stored thereon instructions for providing software development analytics and comprises executable code that, when executed by one or more processors, causes the processors to provision an analytics application in an instance of a software development platform. The analytics application comprises a schema, one or more functions, and one or more dashboard templates. Raw analytics data is extracted according to the schema. The raw analytics data is logged by the software development platform in one or more databases and is based on monitored activity associated with a software development process performed on the software development platform. The one or more functions are then applied to the extracted raw analytics data to generate performance metrics for the software development process. The one or more dashboard templates are populated based on the performance metrics and the populated one or more dashboard templates are embedded into a user interface of the software development platform to facilitate visualization of the raw analytics data.

An analytics apparatus also is disclosed that comprises memory comprising programmed instructions stored thereon and one or more processors configured to execute the stored programmed instructions to provision an analytics application in an instance of a software development platform. The analytics application comprises a schema, one or more functions, and one or more dashboard templates. Raw analytics data is extracted according to the schema. The raw analytics data is logged by the software development platform in one or more databases and is based on monitored activity associated with a software development process performed on the software development platform. The one or more functions are then applied to the extracted raw analytics data to generate performance metrics for the software development process. The one or more dashboard templates are populated based on the performance metrics and the populated one or more dashboard templates are embedded into a user interface of the software development platform to facilitate visualization of the raw analytics data.

The methods, non-transitory computer readable media, and apparatuses of the technology described and illustrated herein extract data from a database of software development and operations information, process that data to generate key metrics, generate visualizations of the data and metrics, and advantageously embed those visualizations back into a user interface of the database. This technology facilitates bulk transformation and storage of data associated with software development platform activity. The extracted data is analyzed to generate accessible visualizations that facilitate interaction and allow for deeper insights into work distribution, efficiency, and quality, for example, of software development processes.

BRIEF DESCRIPTION OF THE DRAWINGS

FIGS. 8A-B are screenshots of an exemplary deployment dashboard.

DETAILED DESCRIPTION

Software development platforms, such as the Salesforce™ platform, enable developers to create add-on applications that are built on the underlying functionality of the platform. For example, the Salesforce™ platform includes services that are accessible to developers to facilitate deployment of add-on applications and websites that are hosted on the Salesforce™ platform and available for use by end users in particular instances associated with the end user organizations in which the add-on applications are provisioned. Many organizations use such platforms to facilitate software development operations and processes. The activity relating to such software development is often tracked or monitored, resulting in the generation and storage of metadata.

The technology described and illustrated by way of the examples herein provides an add-on application that can be provisioned in an organization's instance within a software development platform to facilitate extraction of the metadata in a meaningful way to generate metrics, and visualizations of those metrics, that are then embedded within a user interface of the software development platform. This technology converts the raw data generated on the software development platform into a form that can be effectively visualized, optionally using bulk data transformation and storage tools as well as data visualization tools. Accordingly, this technology provides convenient access to visualizations of metrics relating to software development to facilitate insights and improvements for end users. An exemplary environment for, and an exemplary operation of, this technology will now be described in more detail with reference to FIGS. 1-8.

Figure 1:
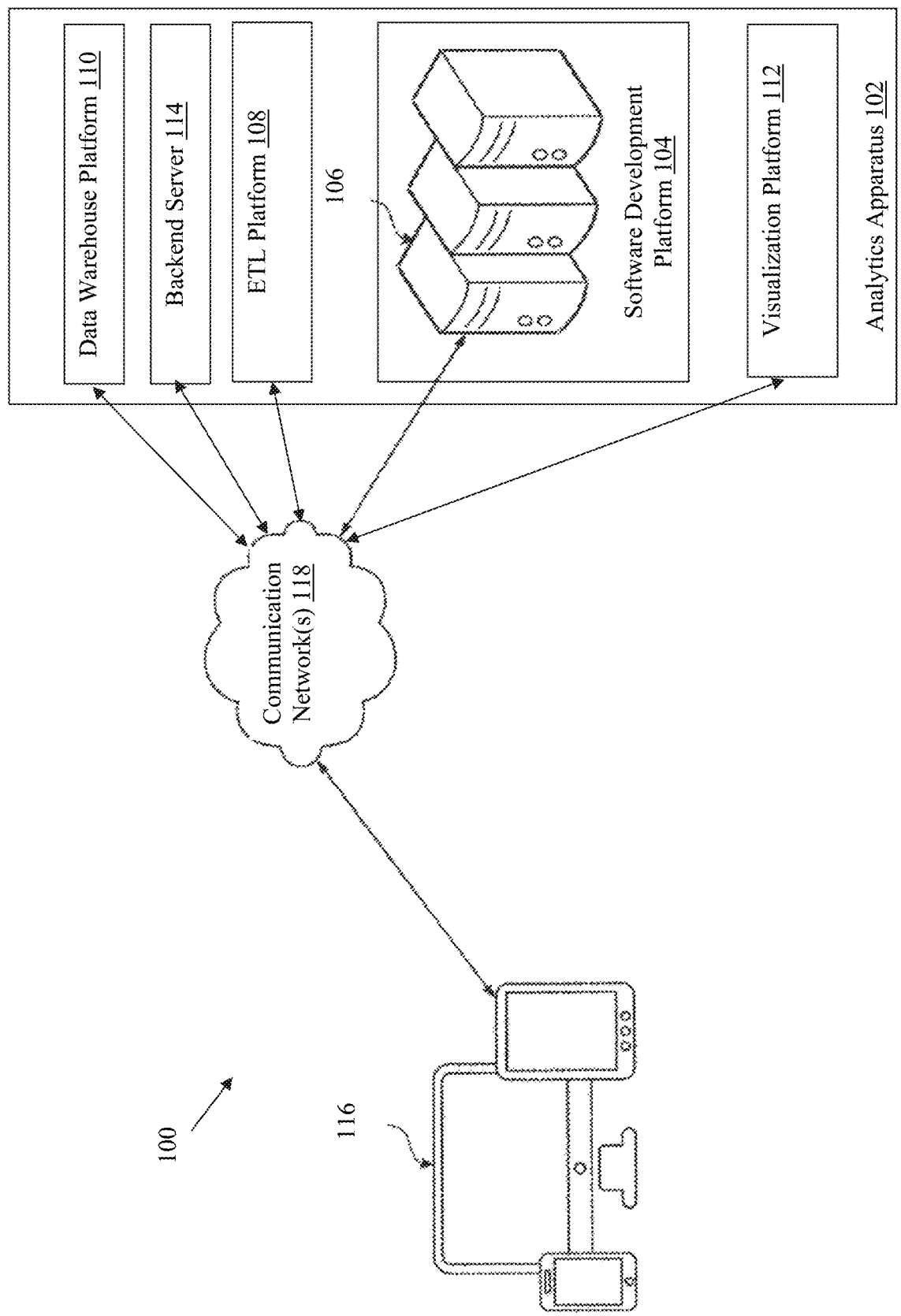
FIG. 1 is a block diagram of an exemplary network environment that includes an analytics apparatus with a software development platform hosted on application servers.

Referring more specifically to FIG. 1, a block diagram of an exemplary network environment 100 that includes an analytics apparatus 102 with a software development platform 104 hosted on application servers 106 is illustrated. The analytics apparatus 102 in this example also includes an extract, transform, and load (ETL) platform 108, a data warehouse platform 110, a visualization platform 112, and a backend server 114. One or more of the ETL platform 108, data warehouse platform 110, or visualization platform 112 can include any number of servers (not shown) hosting applications configured to carry out ETL, storage, and visualization functions, respectively. In other examples, one or more of these functions can be carried out within one or more of the application servers 106, as described and illustrated in more detail below with reference to FIG. 2.

In this particular example, the application servers 106 of the software development platform 104, ETL platform 108, data warehouse platform 110, visualization platform 112, and backend server 114 are coupled to client devices 116 via communication network(s) 116, although one or more of these devices and platforms can be coupled together via other topologies. The network environment 100 also may include other network devices, such as one or more routers or switches, for example, which are known in the art and thus will not be described herein.

In the example network environment 100, service providers can use the software development platform 104 (e.g., the Salesforce™ platform) to provide add-on applications that the client devices 116 can access via the communication network(s) 118. The communication network(s) 118 may include any combination of private, public, wired, or wireless networks. Data communicated over the communication network(s) 118 may be encrypted or unencrypted at various locations or along different portions of the communication network(s) 118. Accordingly, each component depicted in the example network environment 100 may include combinations of hardware and/or software to process data, perform functions, communicate over the communication network(s) 118, and the like.

The software development platform 104, and optionally one or more of the ETL platform 108, data warehouse platform 110, or visualization platform 112, can provide access to a shared pool of configurable computing resources, including servers, storage, applications, a software platform, networks, services, and the like, accessed by the application servers 106 or other devices (not shown). The software development platform 104, and optionally one or more of the ETL platform 108, data warehouse platform 110, or visualization platform 112, in this example supports multiple tenants and may be referred to as a platform as a service (PaaS). The software development platform 104 can be accessible to developers for creating the add-on applications that run on the components of the software development platform 104. Developers can include third-party developers that do not own, operate, provide, or otherwise manage the software development platform 104.

For example, the Salesforce™ platform includes a PaaS called Force.com that is accessible to developers to simplify the development and deployment of add-on applications and websites that are hosted on the Salesforce™ platform and available for use by end users of the client devices 116. Such add-on applications can provide services, such as those described and illustrated by way of the examples herein, that are provided by the application servers 106 and are built on the underlying functionality of the software development platform 104.

The add-on applications provided by application servers 106 are built using one or more programming languages that are particular to the enterprise application platform 102. For example, Force.com™ applications are typically built using Apex™ (a proprietary programming language for Force.com™ that is similar to Java™) and Visualforce™ (a proprietary framework for Force.com™ for developing customized user interfaces). The code used to build add-on applications may include functions that are accessible by the add-on applications. While the Salesforce™ platform is used in the examples described and illustrated herein, other software development, enterprise application, or cloud platforms, programming languages, and/or user interface software can also be used with this technology.

Figure 2:
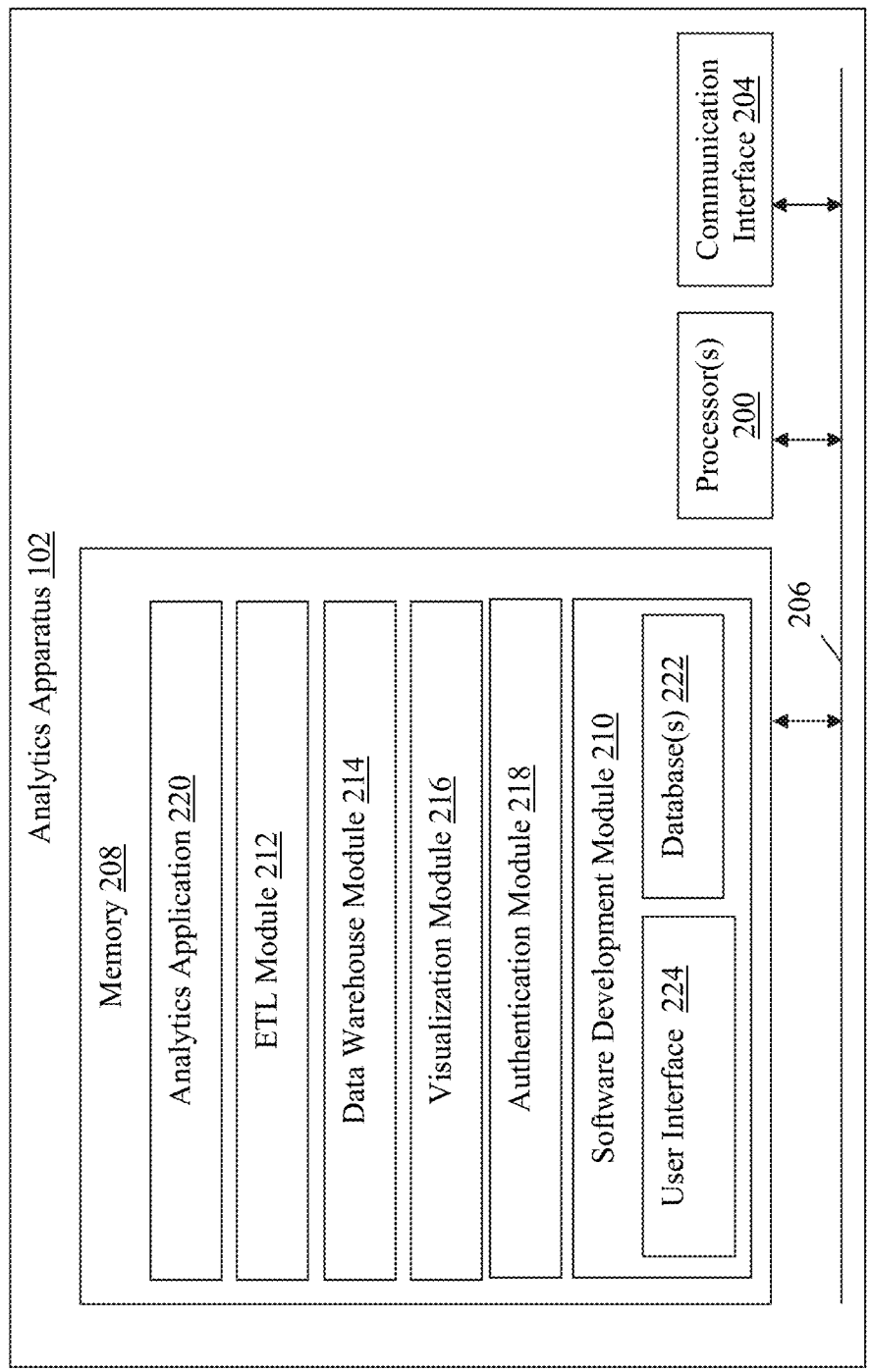
FIG. 2 is a block diagram of an exemplary analytics apparatus.

Referring to FIGS. 1-2, the analytics apparatus 102 may perform any number of functions, including hosting applications, providing ETL, storage, and/or visualization services, and/or access control or authentication, for example. In this example, the analytics apparatus 102 includes processor(s) 200, memory 202, and a communication interface 204, which are coupled together by a bus 206, although the analytics apparatus 102 can include other types or numbers of elements in other configurations, including multiple of these elements spread across any number of platforms, servers, or computing devices.

The processor(s) 200 of the analytics apparatus 102 may execute programmed instructions stored in the memory 208 of the analytics apparatus 102 for any number of the functions identified above and described and illustrated in more detail below. The processor(s) 200 of the analytics apparatus 102 may include one or more central processing units (CPUs) or general purpose processors with one or more processing cores, for example, although other types of processor(s) can also be used.

The memory 208 of the analytics apparatus 102 stores these programmed instructions for one or more aspects of the present technology as described and illustrated herein, although some or all of the programmed instructions could be stored elsewhere. A variety of different types of memory storage devices, such as random access memory (RAM), solid state drives, flash memory, or other computer readable medium which is read from and written to by a magnetic, optical, or other reading and writing system that is coupled to the processor(s) 200, can be used for the memory 208.

Accordingly, the memory 208 of the analytics apparatus 102 can store one or more module that can include computer executable instructions that, when executed by the analytics apparatus 102, cause the analytics apparatus 102 to perform actions, such as to transmit, receive, or otherwise process network messages, for example, and to perform other actions described and illustrated below with reference to FIGS. 3-8. The modules can be implemented as components of other modules, applications (e.g., add-on applications), or separate platforms as described and illustrated above with reference to FIG. 1, for example.

Additionally, the modules may be operative in a cloud-based computing environment. The modules can be executed within or as virtual machine(s) or virtual server(s) that may be managed in a cloud-based computing environment (e.g., software development platform 104). Also, the modules, and even the analytics apparatus 102 itself, may be located in virtual server(s) running in a cloud-based computing environment rather than being tied to one or more specific physical network computing devices. Also, the modules may be running in one or more virtual machines (VMs) executing on the analytics apparatus 102 managed or supervised by a hypervisor.

In this particular example, the memory 208 of the analytics apparatus 102 includes a software development module 210, an ETL module 212, a data warehouse module 214, a visualization module 216, an authentication module 218, and an analytics application 220. The software development module 210 of this example is configured to facilitate aspects of a software development lifecycle, including providing a source code repository and monitoring, and storing raw data associated with, software development activity. The raw data is maintained in databases 222 in this example, which can be hosted by separate database servers of the software development platform 104, for example. The software development module 210 also includes a user interface 224 for accessing the raw data maintained in the database 222, which is improved with this technology via embedded visualizations and dashboard populated with metrics, as described and illustrated in more detail later.

The ETL module 212 in this example is configured to provide ETL services and act as a data bus that extracts the raw data from the databases 222 according to a particular schema and sends the resulting data to the data warehouse module 214. The ETL module 212 may be optimized for bulk data extraction and normalization from disparate data sources.

The data warehouse module 214 is configured to provide multi-tenant storage services as well as to implement a set of provided functions to process the data received from the ETL module 212 to extract and generate metrics from that data. The data warehouse module 214 can provided the generated metrics to the visualization module 216

The visualization module 216 in this example is configured to generate dashboards that visualize the metrics in an accessible, convenient, and meaningful way to allow end users to gain insights from the metrics. The visualization module 216 in some examples can populate provided dashboard templates based on the metrics received from the data warehouse module 214 and embed the resulting dashboards into the user interface 224 (e.g., using iFrames).

The authentication module 218 is configured to provide authentication services to authenticate users of the client devices 116 to confirm that the users should be allowed to access the data, metrics, and dashboards provided by this technology. Accordingly, the authentication module 218 can include permission sets that provide authentication services upon receipt of a request for analytics from one of the client devices 106 and prior to initiating data extraction by the ETL module 212.

The analytics application 220 manages the round trip from raw data extracted by the ETL module 212 to populated dashboards generated by the visualization module 216. Accordingly, the analytics application 220 can include and provide the schema used by the ETL module 212 for data extraction, functions applied by the data warehouse module 214, and dashboard templates populated by the visualization module 216, for example. In the example described above with reference to FIG. 1, the analytics application 220 can be an add-on application provisioned into an organization's instance within the software development platform 104 and executed by one of the application servers 106, although other types of deployment can also be used.

Referring back to FIGS. 1-2, the communication interface 204 of the analytics apparatus 102 operatively couples and communicates between the various components of the analytics apparatus 102 and the client devices 116 that are coupled to the communication network(s) 118, although other types or numbers of communication networks or systems with other types or numbers of connections or configurations to other devices or elements can also be used. By way of example only, the communication network(s) 118 can include local area network(s) (LAN(s)) or wide area network(s) (WAN(s)), and can use TCP/IP over Ethernet and industry-standard protocols, although other types or numbers of protocols or communication networks can be used. The communication network(s) 108 in this example can employ any suitable interface mechanisms and network communication technologies including, for example, Ethernet-based Packet Data Networks (PDNs).

While the analytics apparatus 102 is illustrated in this example as including a single device (e.g., one of the application servers 106), the analytics apparatus 102 in other examples can include a plurality of devices spread across any number of platforms or cloud networks and each having processor(s) (each processor with processing core(s)) that implement one or more steps of this technology. In these examples, one or more of the devices can have a dedicated communication interface or memory. Alternatively, one or more of the devices can utilize the memory, communication interface, or other hardware or software components of one or more other devices included in the analytics apparatus 102.

Additionally, one or more of the devices that together comprise the analytics apparatus 102 in other examples can be standalone devices or integrated with one or more other devices or apparatuses. Moreover, one or more of the devices of the analytics apparatus 102 in these examples can be in a same or a different communication network including one or more public, private, or cloud networks, for example.

The client devices 116 of the network environment 100 in this example include any type of computing device that can exchange network data, such as mobile, desktop, laptop, Internet of Things (IOT), or tablet computing devices, virtual machines (including cloud-based computers), or the like. Each of the client devices 116 in this example includes a processor, a memory, and a communication interface, which are coupled together by a bus or other communication link (not illustrated), although other numbers or types of components could also be used.

The client devices 116 may run interface applications, such as standard web browsers or standalone client applications, which may provide an interface to make requests for, and receive content stored on, one or more of the application servers 106 via the communication network(s) 118. The client devices 116 may further include a display device, such as a display screen or touchscreen, or an input device, such as a keyboard for example (not illustrated).

Although the exemplary network environment 100 with the analytics apparatus 102, client devices 116, and communication network(s) 118 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

The examples may also be embodied as one or more non-transitory computer readable media having instructions stored thereon, such as in the memory 208 of the analytics apparatus 102, for one or more aspects of the present technology, as described and illustrated by way of the examples herein. The instructions in some examples include executable code that, when executed by one or more processors, such as the processor(s) 200 of the analytics apparatus 102, cause the processors to carry out steps necessary to implement the methods of the examples of this technology that are described and illustrated herein.

While the software development module 210, ETL module 212, data warehouse module 214, and visualization module 216 are illustrated in FIG. 2 as implemented via applications, for example, within the same memory 208 of the analytics apparatus 102, the functionality of one or more of the software development module 210, ETL module 212, data warehouse module 214, and visualization module 216 can be provided via servers hosted by separate platforms, as explained above with reference to FIG. 1. In a particular example of such an implementation, FIG. 3, which will now be described, illustrates a flow diagram of an exemplary method for providing software development analytics via separate platforms coupled together via communication network(s) 118.

Figure 3:
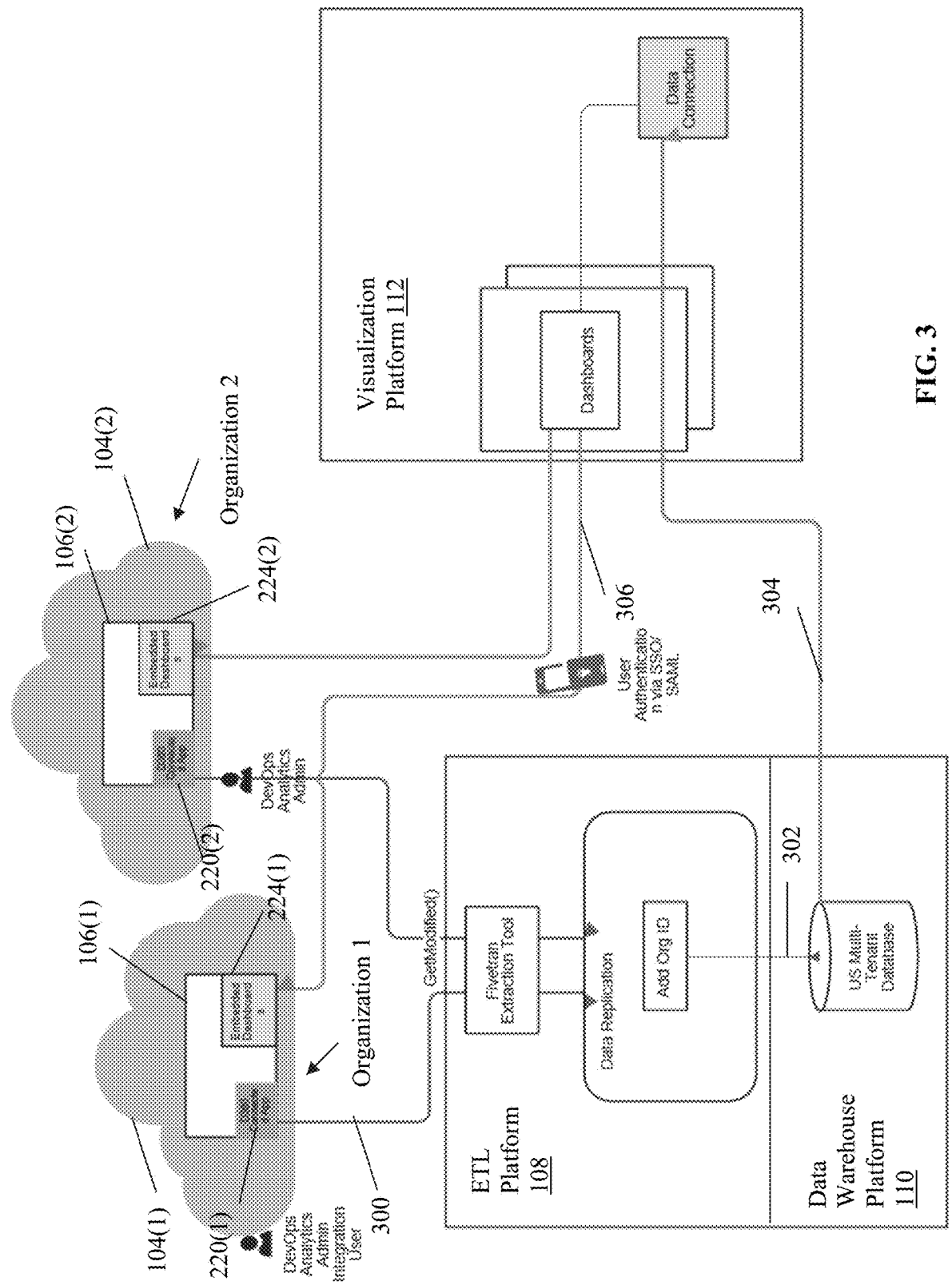
FIG. 3 is a flow diagram of an exemplary method for providing software development analytics via separate platforms coupled together via communication network(s)

In step 300 illustrated in FIG. 3, an analytics application 220 in the software development platform 104(1) and hosted by application server 106(1) initiates extraction of data by the ETL platform 108 from the software development platform 104(1). The analytics application 220 could be an add-on application previously provisioned or deployed into an instance associated with organization #1 in the software development platform 104(1). The analytics application 220 can initiate the data extraction in response to a request for analytics received from one of the client devices 116, for example.

Optionally, the analytics application 220(1) can send the analytics request, or details extracted therefrom, to the backend server 114, which is associated with a provider of the analytics application 220(1) and is configured to authenticate the request. In these examples, the backend server 114 can initiate the data extraction via a communication to the ETL platform 108 instead of the direct initiation by the analytics application 220(1) illustrated in FIG. 3.

Subsequent to initiation, the ETL platform 108 uses an ETL tool to extract the raw analytics data from the software application platform 104(1). Upon provisioning, or as part of initiating the data extraction, the analytics application 220(1) can be configured to send a schema to the ETL platform 108 that defines the type, format, and/or parameters, for example, of the data extraction. Additionally, the ETL platform 108 can generate a unique identifier for organization #1 or receive the unique identifier from the backend sever 114. In some examples, the ETL platform 108 can be provided by Fivetran, Inc. of Oakland, Calif., although any other ETL platform can also be used in other examples.

In step 302, the ETL platform 108 sends the data output by the ETL tool to the data warehouse platform 110 along with the unique identifier for organization #1. The data warehouse platform 110 then stores the analytics data in a multitenant database indexed or keyed by the unique identifier for organization #1. The data warehouse platform 110 processes the analytics data according to a set of functions. The analytics application 220(1) can be configured to send the set of functions to the data warehouse platform 110 upon provisioning in some examples. The set of functions are configured to analyze the analytics data to generate performance metrics from the data. In some examples, the data warehouse platform 110 can be provided by Snowflake, Inc. of Bozeman, Mont., although any other data warehouse platforms can also be used in other examples.

In step 304, the data warehouse platform 110 sends the metrics to the visualization platform 112. The visualization platform 112 then processes the performance metrics to populate stored template dashboards. The analytics application 220(1) can be configured to send the template dashboards to the data warehouse platform 110 upon provisioning in some examples. Additionally, the visualization platform 112 can be provided by Tableau Software, LLC of Mountain View, Calif., although any other visualization platforms can also be used in other examples.

In step 306, the visualization platform 112 provides the populated dashboard to the software development platform 104(1) in a format that embeds the populated dashboards into the user interface 224(1). For example, the visualization platform 112 can use iFrames to integrate the populated dashboards in a convenient and accessible format.

Optionally, in addition to or instead of authenticating the user earlier, the backend server 114 can facilitate the integration of the populated dashboards after authenticating a user of one of the client devices 116 that requested the analytics in step 306. In these examples, authentication is performed by allowing a connection, encrypted using TLS or equivalent protocols, between the database (e.g., user interface 224(1) of the database 222) and the visualization platform 112. Per-user authentication is performed using single sign-on (SSO) by linking the user's account in a source database with an underlying account in the visualization platform 112. FIG. 3 also illustrates a corresponding flow with respect to a second instance within software development platform 104(2) that is associated with organization 2.

Accordingly, in some examples, this technology leverages an analytics application 220 deployed into a software development platform 104 (e.g., Salesforce™) to facilitate software development analytics using third party platforms and service providers to manage the ETL, data storage, and visualization of performance metrics for a software development process or operation carried out on the software development platform 104. The analytics application 220 can be provisioned in any number of software development platforms while the relatively complex extraction, calculations, and visualization are facilitated by the analytics application 220 (e.g., via communication of schema, functions, and dashboard templates), but carried out in an optimized and accelerated way by multi-tenant platforms.

Figure 4:
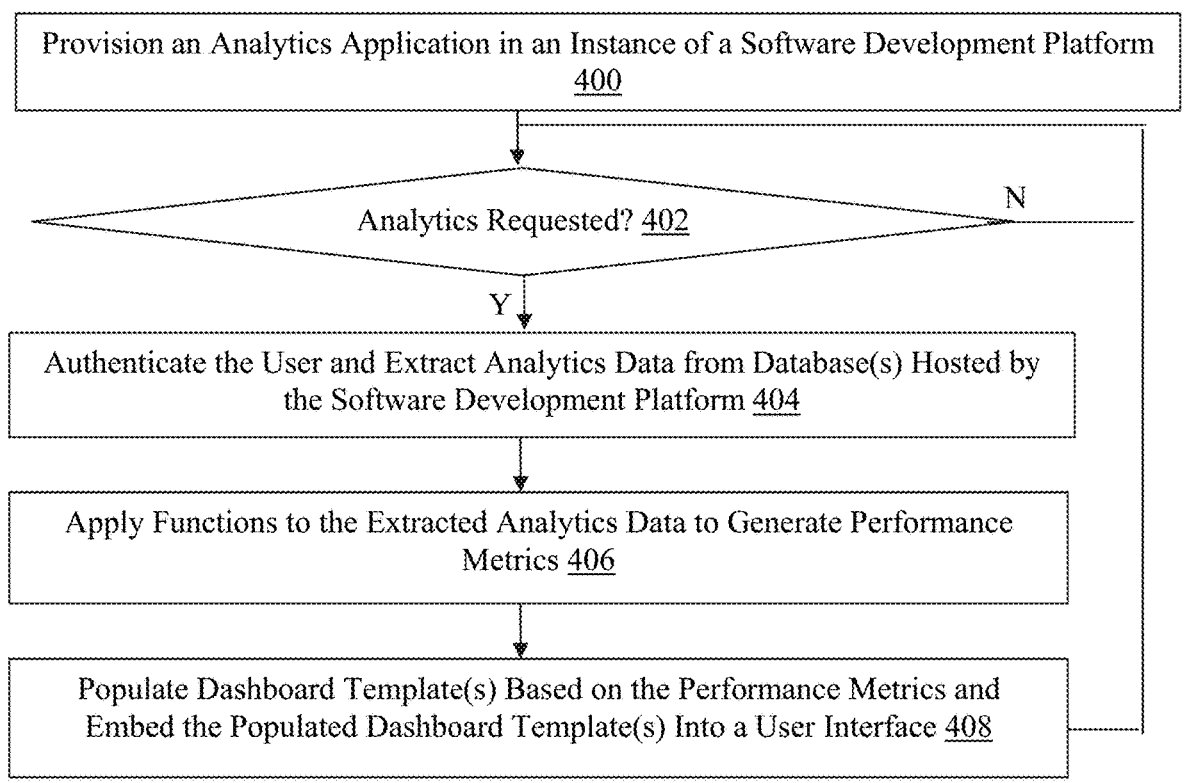
FIG. 4 is a flowchart of an exemplary method for providing software development and operation process analytics.

Referring now to FIG. 4, a flowchart of an exemplary method of providing software development and operation process analytics is illustrated. In step 400 in this example, the analytics apparatus 102 (e.g., one of the application servers 106 of the analytics apparatus 102) provisions the analytics application 220 in an instance of software development platform 102 that is associated with a particular organization. An user or other administrator associated with the organization can provision the analytics application 220 (e.g., an add-on application) from a repository associated with the software development platform (e.g., Salesforce™), for example. Optionally, the user can be authenticated by a backend server or the software development platform prior to the application deployment.

In some examples, subsequent to being provisioned, the analytics application 220 is configured to send a schema to the ETL platform 108, a set of functions to the data warehouse platform 110, and/or dashboard templates to the visualization platform 112. Also optionally, the analytics application 220 includes permission sets that can be utilized in a subsequent data extraction process so that only authorized users have the correct permissions to extract the data from the software development platform 102. A permission set can be assigned to any user that has authorization to perform a data extraction for the analytics application 220. Limiting the privileges of the data extraction to a permission set ensures that no additional or unauthorized data can be extracted.

In step 402, the analytics apparatus 102 (e.g., one of the application servers 106 on which the application was provisioned in step 400) determines whether an analytics request has been received. The analytics request can be received from one of the client devices 116 and via an interaction with the user interface 224, for example, although other methods for initiating an analytics request can also be used in other examples. If the analytics apparatus 102 determines that an analytics request has been received, then the Yes branch is taken to step 404.

In step 404, the analytics apparatus 102 authenticates the user and then the analytics apparatus 102 (e.g., the ETL platform 108) extracts analytics data from the database(s) 222 hosted by the software development platform 102. The authentication can be performed by the analytics application 220 independently or in combination with the backend server 114. In examples in which the backend server 114 authenticates a user based on receiving the analytics request from the analytics application 220, for example, the backend server 114 can subsequently initiate the extraction by the ETL platform 108.

The extraction in this example is of raw data from the database(s) 222 and is based on a predefined schema which ensures that the analytics data sent to the data warehouse platform 110 is consistent across all tables and columns. In some examples, the analytics data includes data from a CI/CD platform, data from a source control repository, and/or data from a project management application, although other types of data associated with other types of applications or platforms associated with a software development lifecycle managed by the software development platform 102 can also be used in other examples.

In step 406, the analytics apparatus 102 (e.g., the data warehouse platform 110) applies a set of functions to the extracted analytics data to generate performance metrics for a software application in development on the software development platform 102. The extracted data in the repeatable schema is sent to the data warehouse platform 112 in some examples, where stored functions or procedures are executed and views are created per schema ID in order to join columns from multiple data tables.

Accordingly, each schema ID contains common tables and columns and complex calculations are executed on multiple tables that are joined by a common data point. The schema ID could have been generated by the ETL platform 108 or the backend server 114, for example. The analytics data referenced in the views and stored procedures is then optionally cleansed and transformed by the data warehouse platform 110.

In some examples, at least a subset of the metrics generated as a result of the procedure or function execution track the movement of work between development and production environments within the software development platform 102. In these examples, the metrics include time-based metrics that measure how long it takes to deliver a work item to a production environment, how often certain files are being deployed across environments, and/nor the overall successes and failures of deployments across environments. These metrics indicate the overall health of the software development process for a particular organization How long it takes to deliver a work item to a production environment for the first time is referred to herein as lead time. Accordingly, lead time is based on the time between when a work item is ready to be deployed to the time it is actually deployed for the first time in a production environment. In other words, lead time is determined based on two date/time fields: (1) the first time a work item is ready for deployment to any environment and (2) the first time a work item is deployed to a production environment.

The analytics apparatus 102 in some examples also is configured to identify user stories as a business disrupting failure. The work item that is identified as a failure can be associated with a release or promotion, which may have caused the failure. This association contributes to the determined of a change fail rate, which as used herein is the percentage of releases or promotions that cause a failure in a production environment. Once a user has fixed the failure and deployed the fix to the production environment, the lead time for delivery of that fix can be tracked which is referred to herein as the recovery time.

Optionally, the analytics application 220 also can be configured to generate intermediate metrics that are combined with the pre-existing data in the database(s) 222 that is extracted by the ETL platform 108 and also used by the data warehouse platform 110 and visualization platform 112. The intermediate metrics can be based on a flag identifying an environment as a production environment, the lead time that it takes to move a change from a development environment to a production environment, the mean time to restore from a failure, a timestamp indicating when a work item is first marked ready for deployment, and a timestamp indicating when a work item is first promoted to a production environment, for example.

In step 408, the analytics apparatus 102 populates dashboard template(s) based on the performance metrics generated in step 406 and embeds the populated dashboard template(s) into the user interface 224. In some examples, the performance metrics are grouped into four dashboards including overview, planning, development, and deployment dashboards, although another number or type of dashboard can also be used in other examples. Each dashboard has a unique visualization and user interface and displays a unique set of performance metrics.

The dashboards can be presented as tabs on the user interface 224, for example, each of which displays performance metrics related to the metadata being moved through a CI/CD pipeline across environments. Accordingly, each tab represents a part of the software development process and displays performance metrics related to that part of the process. Optionally, the visualizations can include line graphs, treemaps, and/or bubble charts that depict different types of analytics data in the form of performance metrics. Links to individual records in the database(s) 222 can be included in the data visualizations to allow users to navigate from the dashboard(s) to details about particular records in the source system (i.e., the software development platform 102).

Accordingly, after the dashboard templates are populated, the user interface for the data visualizations of the populated dashboard templates is then embedded inside the software development platform 102 user interface 224 to allow users to view and interact with these visualizations alongside the source data. Exemplary performance metrics, dashboards, and visualizations will now be described with reference to FIGS. 5-8.

Figure 5A:
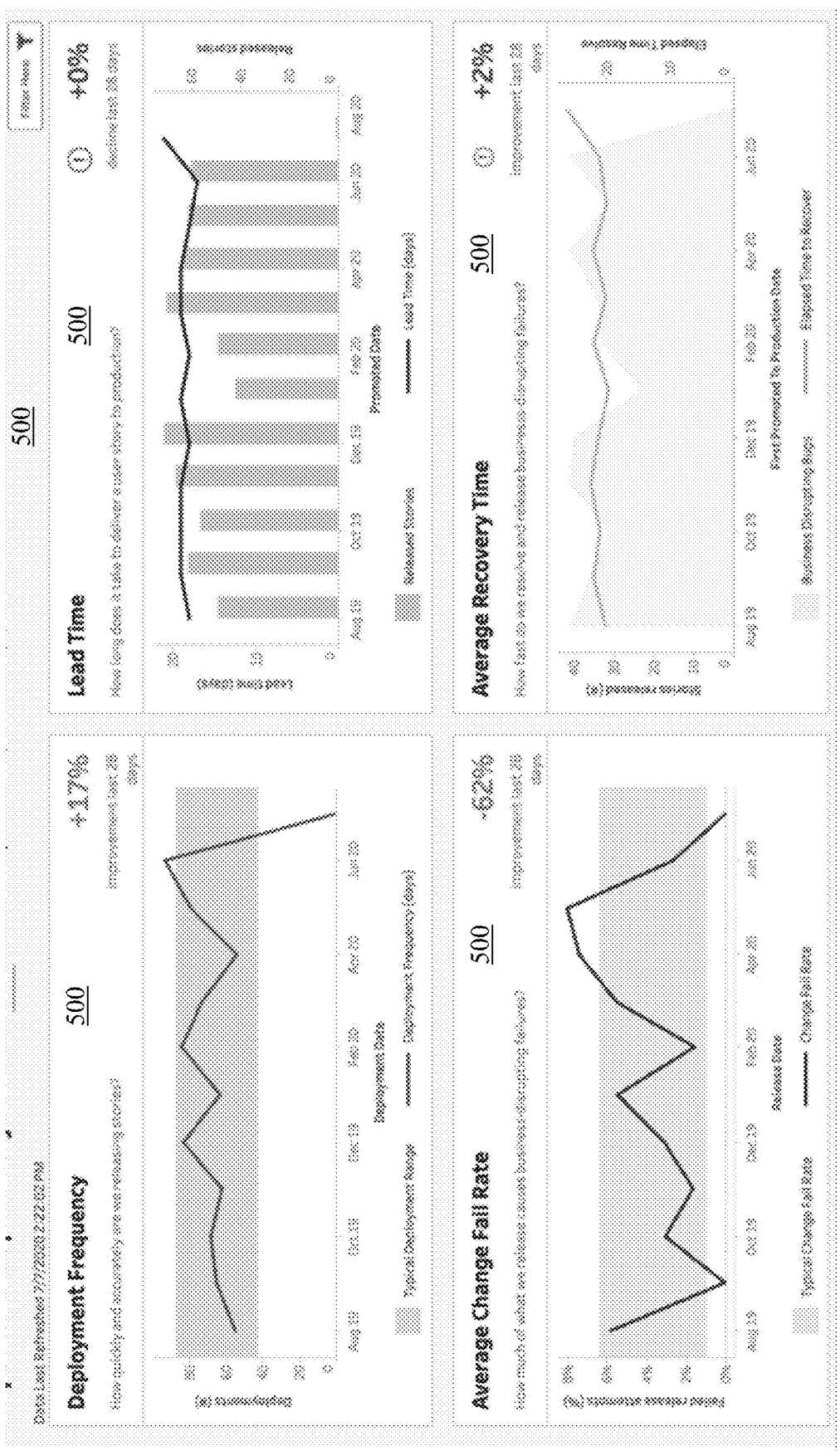
FIGS. 5A-C are screenshots of an exemplary overview dashboard.
Figure 5B:
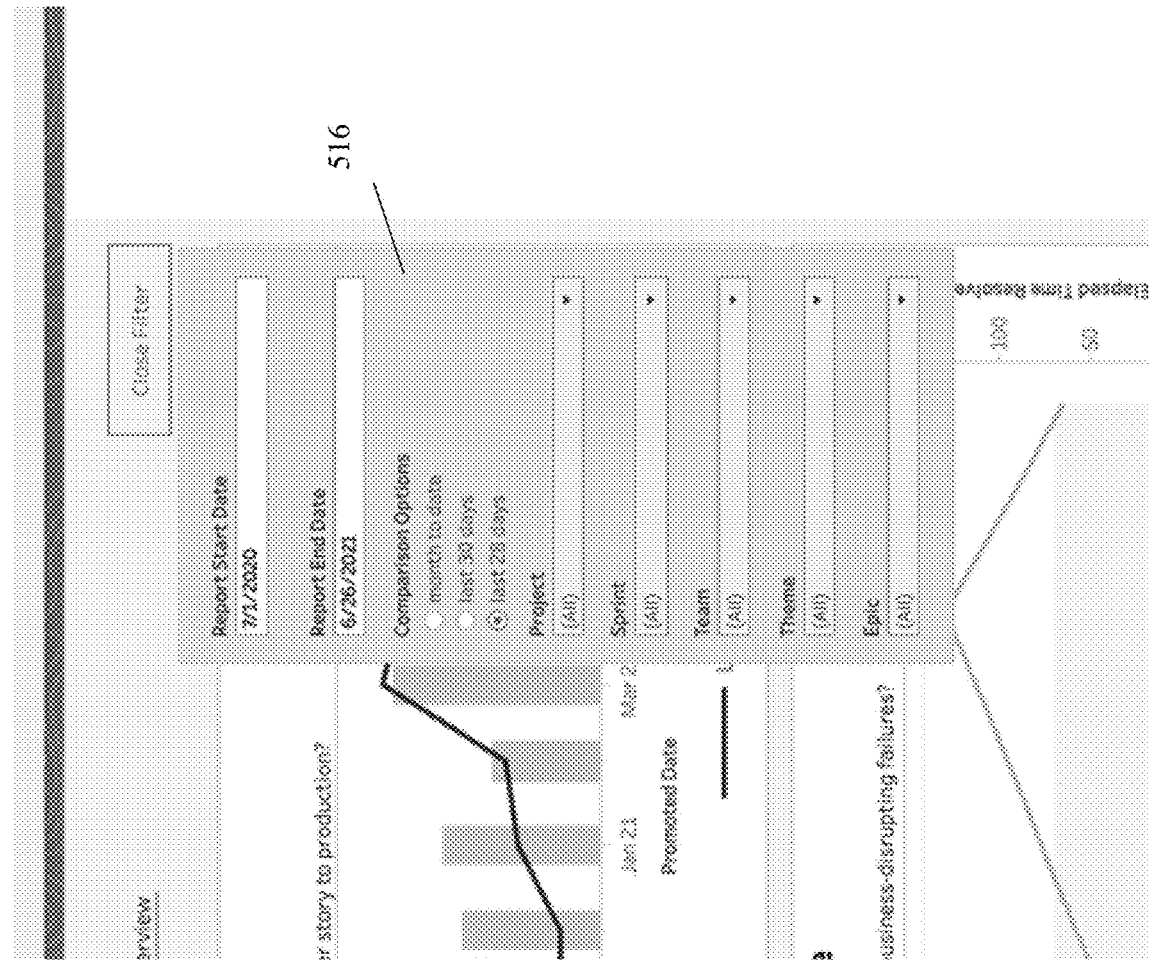
Figure 5C:
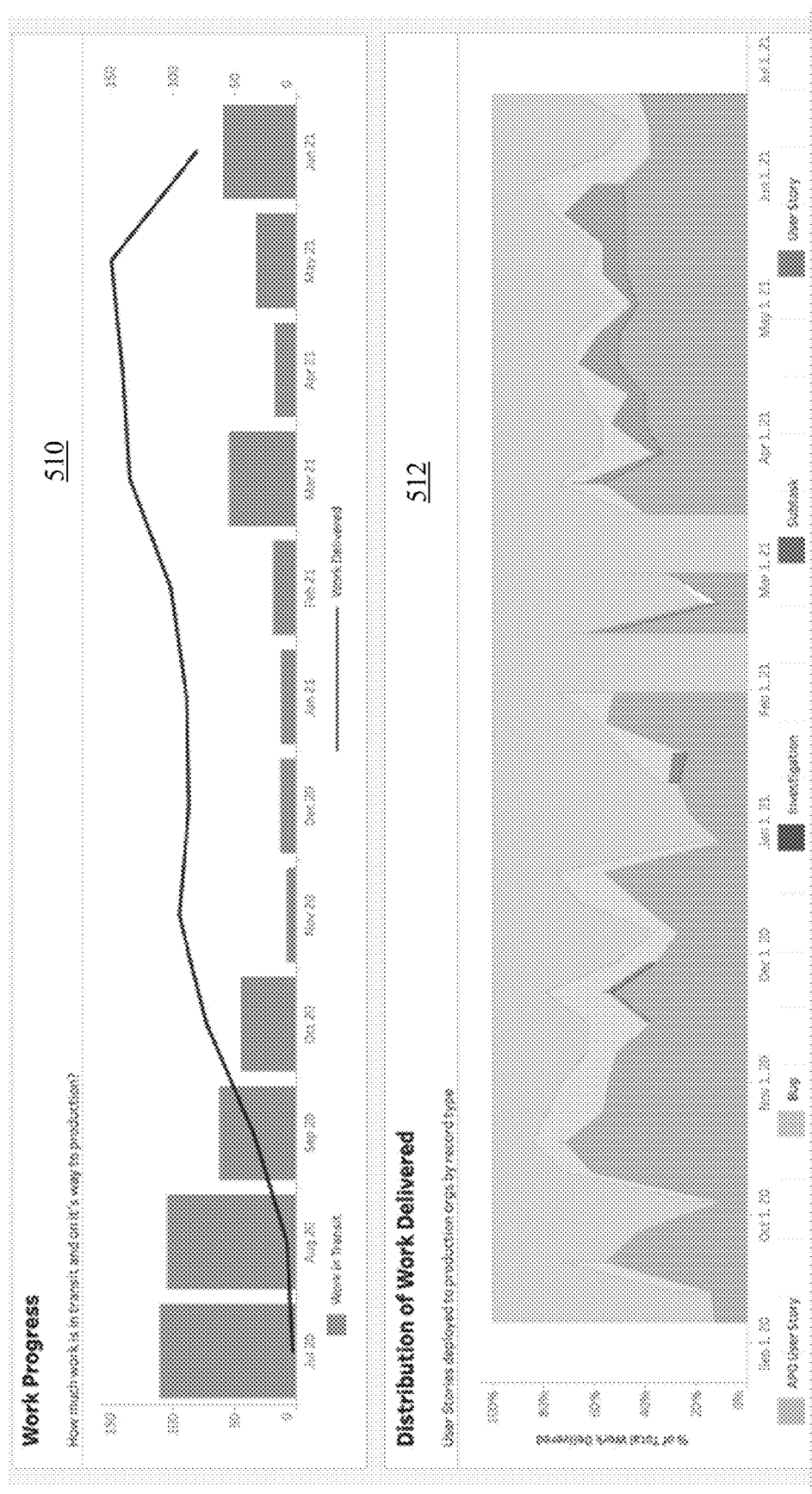

Referring specifically to FIGS. 5A-C, screenshots of an exemplary overview dashboard 500 are illustrated. The overview dashboard 500 in this particular examples includes the following components: deployment frequency 502, lead time 504, average change fail rate 506, average recovery time 508, work progress 510, and distribution of work delivered 512. The deployment frequency component 502 illustrates the frequency of promotions to a production environment in a line chart. The Y axis indicates the number of promotions (which contain many deployments) and the X axis displays the dates. Optionally, a control chart can be included and the chart can be interactive and can display the exact promotion count when hovering over the line.

The lead time component 504 displays the lead time for user stories that are promoted to a production environment in a line chart. Behind the line chart there is a bar graph which displays a count of user stories that have been promoted to a production environment. In the lead time component 504 a user can compare the number of user stories delivered against the overall lead time in days.

The average change fail rate component 506 displays the rate at which a promotion to production has caused a business disruption. A business disruption can also be referred to as system downtime due to a promotion. The change fail rate is determined in this example as a number of promotions in which a business disrupting failure is detected divided by a total number of promotions to production. The average change fail rate is displayed in this example as a line with a control chart over a series of time.

The average recovery time component 508 displays the recovery time for the business disrupting defects that caused downtime. The average recovery time component 508 includes all of the defects that are business disrupting failures displayed as a line and a graph. The graph displays the total count of business disrupting defects and the line displays the elapsed time to resolve in hours. Elapsed time to resolve indicates how long it took in the form of hours to deliver a fix to a production environment for the identified business disrupting defects.

In this particular example, each of the deployment frequency component 502, lead time component 504, average change fail rate component 506, and average recovery time component 508 includes a key performance indicator (KPI) in the top right corner, which is a percentage of the increase or decrease in the metric in the last 28 days. Optionally, colors are controlled based on a formula that displays the KPI in red or green based on a positive or negative change. For lead time, deployment frequency, and average recovery time, a decline is a negative change, and therefore each KPI is displayed in red. For average change fail rate, a decline is considered a positive change, and therefore the associated KPI can be displayed in green.

The work progress component 510 displays the amount of work that is delivered to a production environment in the form of user stories. The bar chart displays the record count of user stories that are in transit to production. By definition, the user stories have committed changes and are ready for promotion to any environment in the CI/CD pipeline, however they have not been deployed to a production environment yet. The line chart displays the work that has been delivered. Work delivered is the count of user stories that have been promoted to a production environment. These user stories can be found by referencing the first rime promoted to production date/time field in the data extracted from the database(s) 222.

The distribution of work delivered component 512 displays user stories that are promoted to production by record type. Each record type is represented as a different color in the component in this example. The legend displays the values for the user story record types. Optionally, a drop down menu provides a filter 516 that can be applied to the entire overview dashboard 500 to filter data based on dates, project, sprint, team, theme, and epic in this example, although other types and/or number of filters can also be provided in other examples.

Figure 6A:
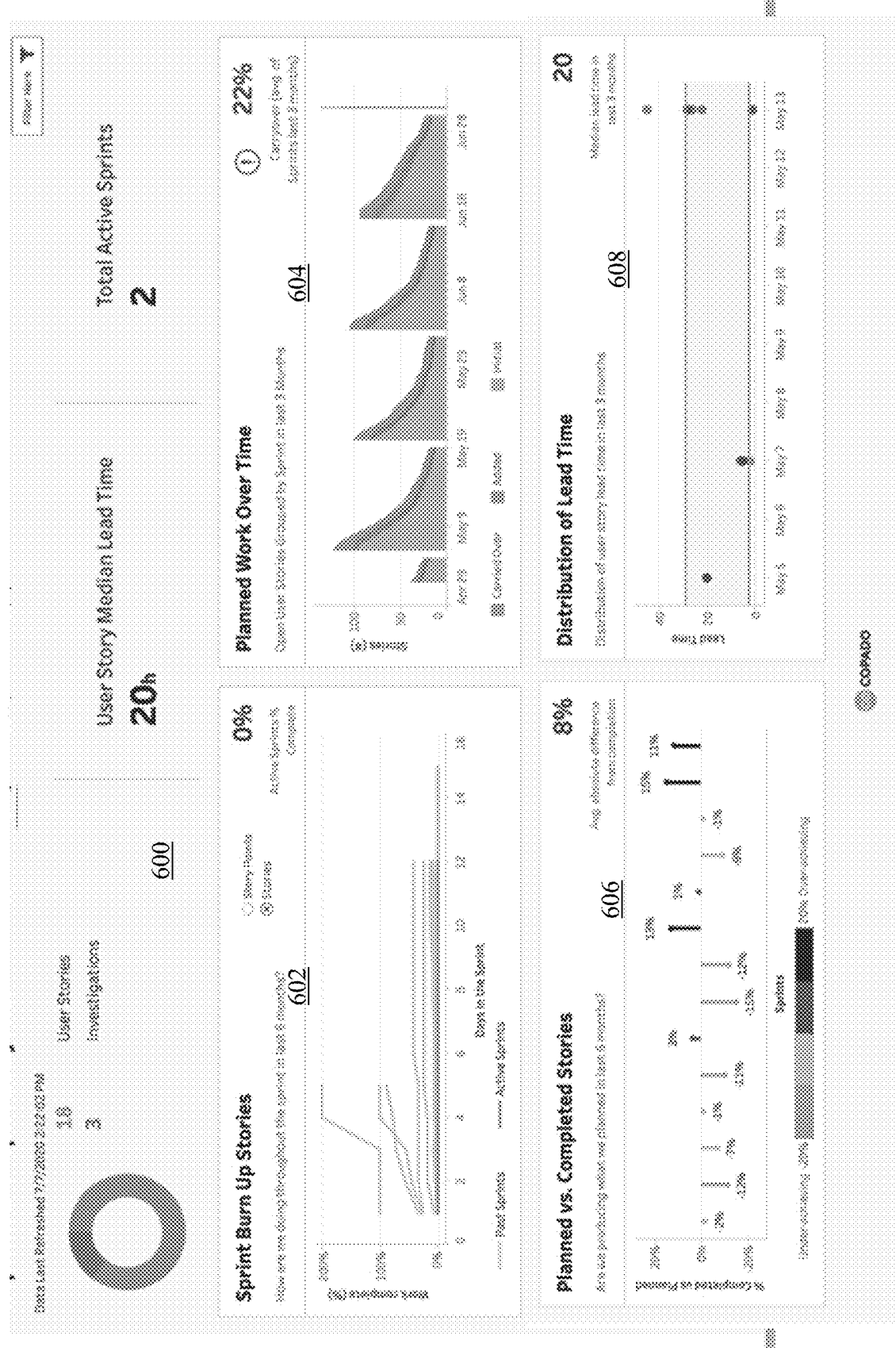
FIGS. 6A-B are screenshots of an exemplary planning dashboard.
Figure 6B:
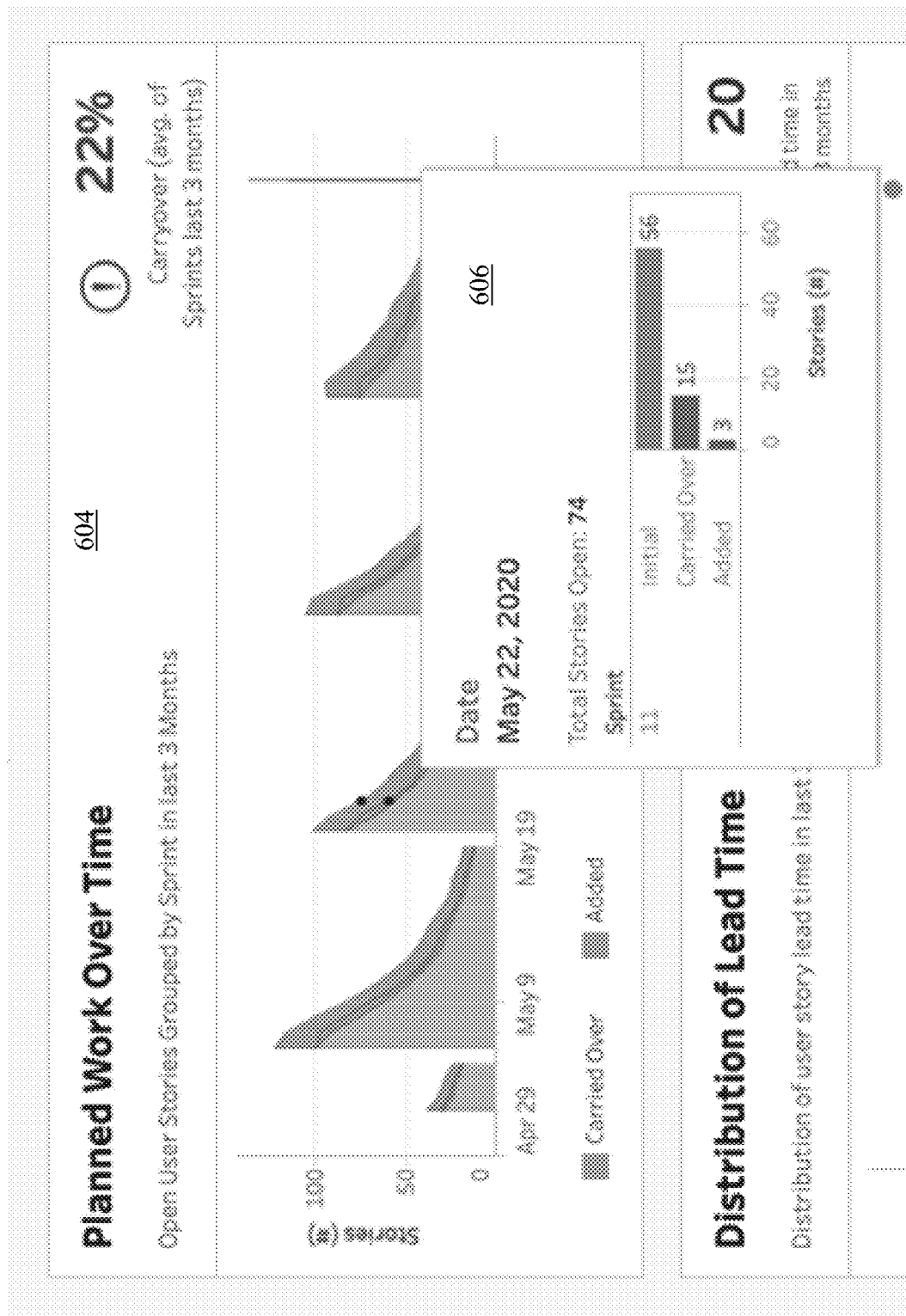

Referring to FIGS. 6A-B screenshots of an exemplary planning dashboard 600 are illustrated. Metrics related to planning work in sprints and releases that are inclusive of a burn up/down chart 602, planned work over time chart 604, and planned versus completed comparisons chart 606 are all displayed on the planning dashboard 600 in this example. The planning dashboard 600 includes metrics related to a work in multiple time periods and includes visualizations such as burn down charts, burn up charts, work distribution charts, and a lead time scatter plot 608 depicting lead times of different work items in some examples.

In the sprint burn up/down chart 602 in this example, the burn-up rate for user stories in each sprint are illustrated. The number of user stories committed on the first day of the sprint and the rate at which they are completed are also illustrated. The metric in the sprint burn up/down chart 602 is utilizing analytics data from the first ready to promote time field in the database(s) 222 to categorize a user story as completed for a particular sprint. Additionally, this metric is utilizing analytics data from the development complete field of the database(s) 222 to categorize a user story as completed for a particular sprint. For these fields, and for other activity data to populate in the database(s), some software development platforms includes the Salesforce™ platform require that a field history tracking feature is enabled. In other platforms, activity logging may include some or all of the analytics data by default.

The planned work over time chart 604 in this example illustrates three categories of work for a given sprint in overlay 606: (1) initial commitment (i.e., how many user stories were initially committed to the sprint based on the start date), (2) added work (i.e., how many user stories were added to the sprint after the sprint start date), and (3) carried overwork (i.e., how many user stories were carried over from a previous sprint). Additionally, the planned versus completed comparisons chart 606 compares the user stories that were planned for the sprint versus the user stories that were completed. The planned versus completed comparisons chart 606 also indicates a team that has either over-delivered or under-delivered: Planned stories as used herein are stories that were committed on the first day of the sprint. Completed stories as used herein are stories that are development complete.

The lead time scatter plot 608 illustrated the distribution of lead time from all user stories that have been promoted to production. Lead time as used herein is the average time it takes for a work item to be completed plus the waiting time. At the top of the planning dashboard 600, three KPIs that highlight: distribution of work are provided as well as user story median lead time and the number of active sprints. In other examples, other information can provided on the planning dashboard 600 that relates to a planning phase of a software development lifecycle.

Figure 7:
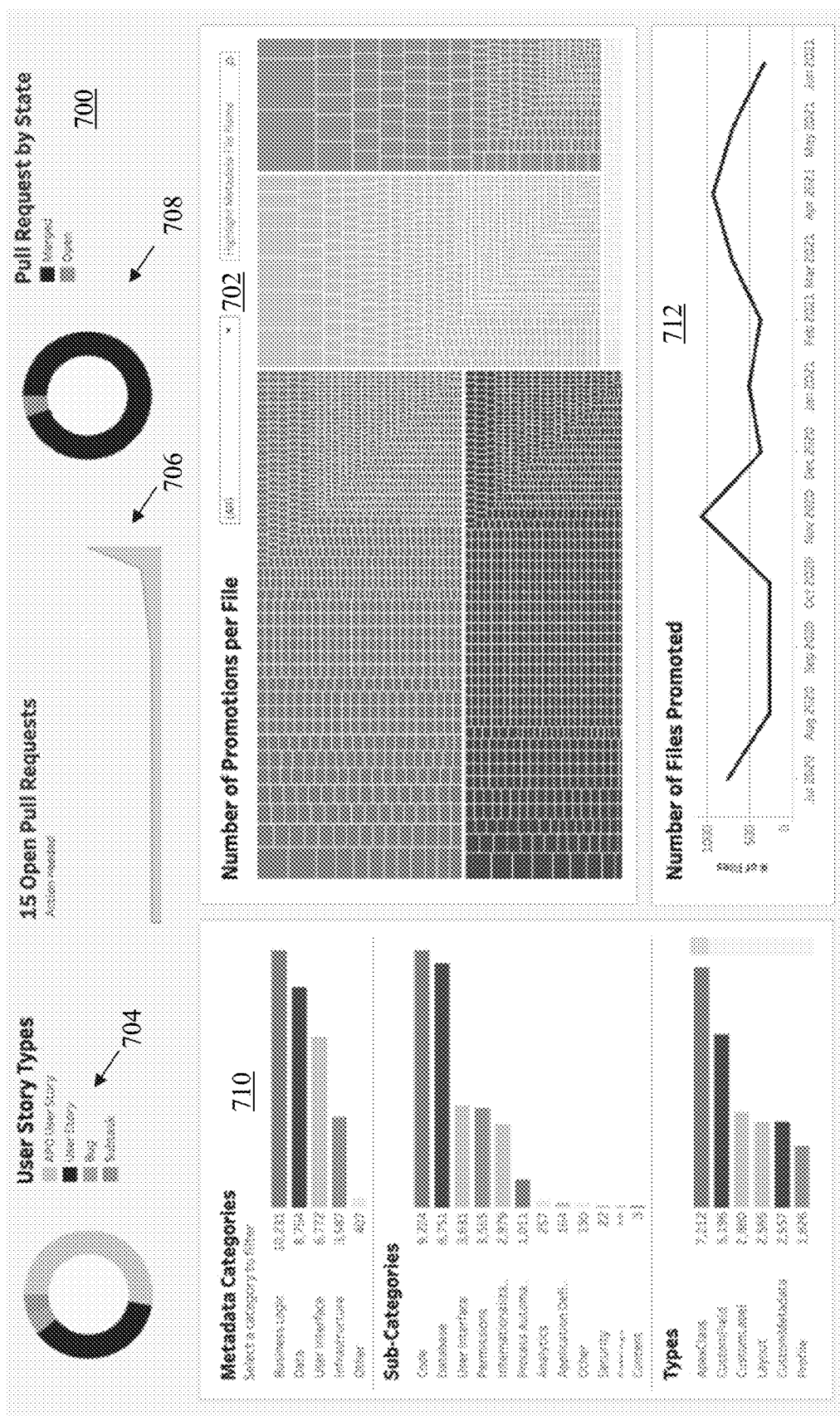
FIG. 7 is a screenshot of an exemplary development dashboard.

Referring to FIG. 7, a screenshot of an exemplary development dashboard 700 is illustrated. Development metrics that are focused on number of deployments per file, open pull requests, and diversity of file types are all displayed on the development dashboard 700. Deployment frequency, average size of deployment, lead time in hours, and average number of deployments are also displayed on the development dashboard 700 in this particular example. Accordingly, the development dashboard 700 includes information about the metadata in deployments and the breakdown of what is being promoted up the pipeline.

The treemap 702 indicates the types of metadata files are being promoted and the number of times they are promoted. In particular, the treemap 702 displays the number of promotions per metadata file, including destructive changes. Each square represents a single file. Hovering over a square will display the file name, type, and the number of promotions that are associated with that file in this example. The larger the number of promotions, the larger the size of the square. The treemap 702 also adjusts based on selections to the metadata categories. Specifically, selection of a specific category or metadata type from results in a display of the number of promotions for that particular item. The development dashboard 700 facilitates a drill down through these metrics by selecting any area and filtering to focus on a particular user story record type (e.g., user story, investigation, or bug) or metadata category.

The development dashboard 700 also includes a plurality of KPIs disposed toward the top in this example, including user story types 704, open pull requests 706, and pull requests by state 708. The KPIs highlight information about the user story record types in the associated organization as well as data from a snapshot object (e.g., a Git or other version control system snapshot) to capture metrics like pull requests by state and number of open pull requests.

The user story types KPI 704 in this particular examples is a donut chart illustrating the number of user stories per record type. The open pull requests KPI 706 displays the number of open pull requests that require action based on the related pull request review record. If a review record exists related to the pull request and is in an open state, the pull request will display in the needing action component. Additionally, the pull requests by state KPI 708 displays the open and merged pull requests. The data warehouse platform 110 in this example transforms the data so that open and merged values are displayed to the user. In some examples, the software development platform 102 API supports deleting components with a deployment using destructive changes. In these examples, deleted files can be views by toggling a menu to see Files with Destructive Changes.

The metadata categories component 710 displays the various categories that are associated with the software development platform 102 metadata types, such as business logic, user interface, or infrastructure. Selection of any of these categories displays a subcategories and metadata types included in the selected category. As with categories, a particular sub-category can be selected to view metrics pertaining to that specific sub-category. The types of the metadata categories component 710 correspond to the software development platform 102 metadata types. To further drill down, one of the metadata types can be selected to filter the results of the treemap 702. Additionally, the number of files promoted component 712 is a line chart illustrating the number of promotions over time together with the files included in each promotion.

Figure 8A:
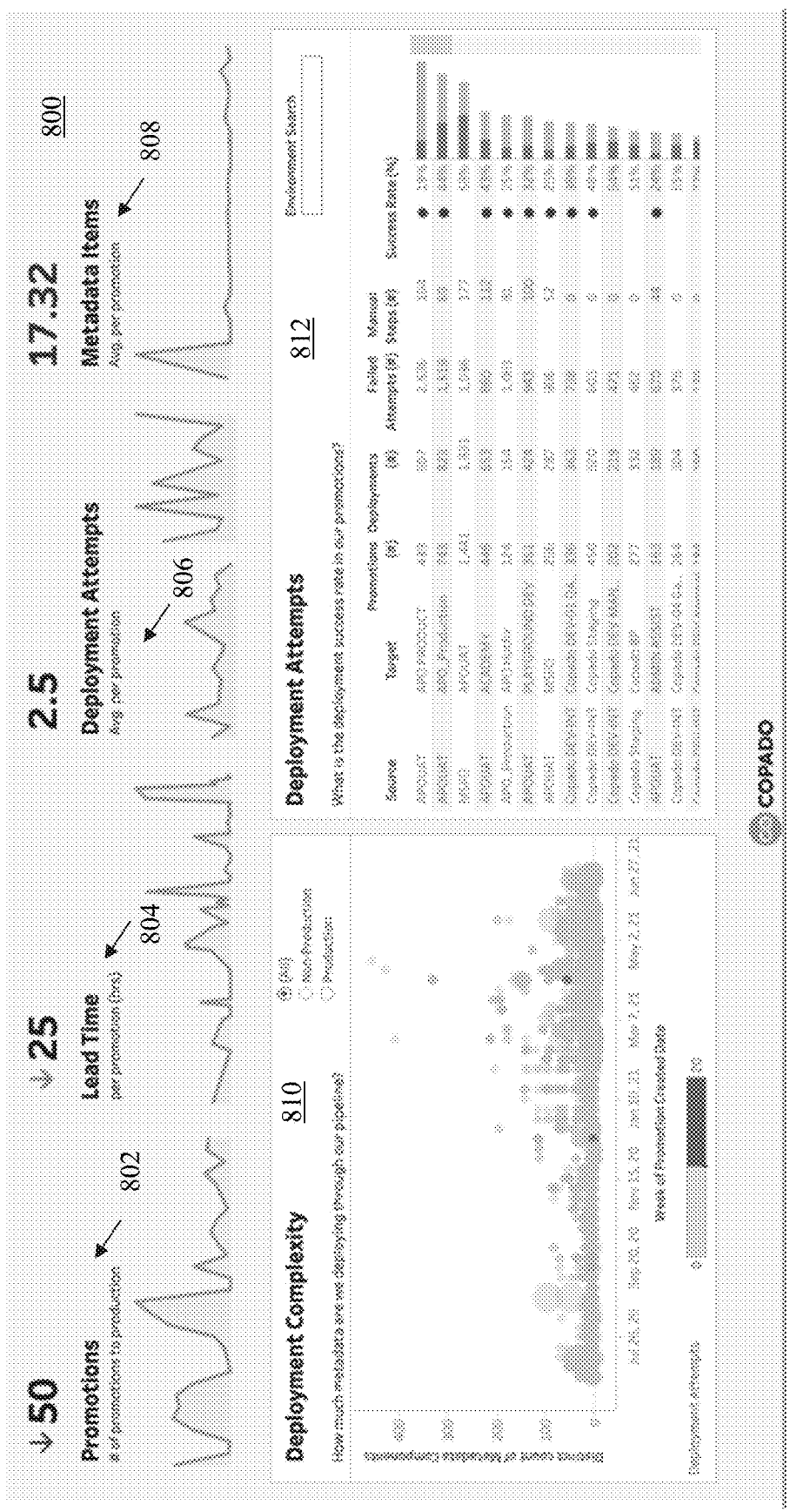
Figure 8B:
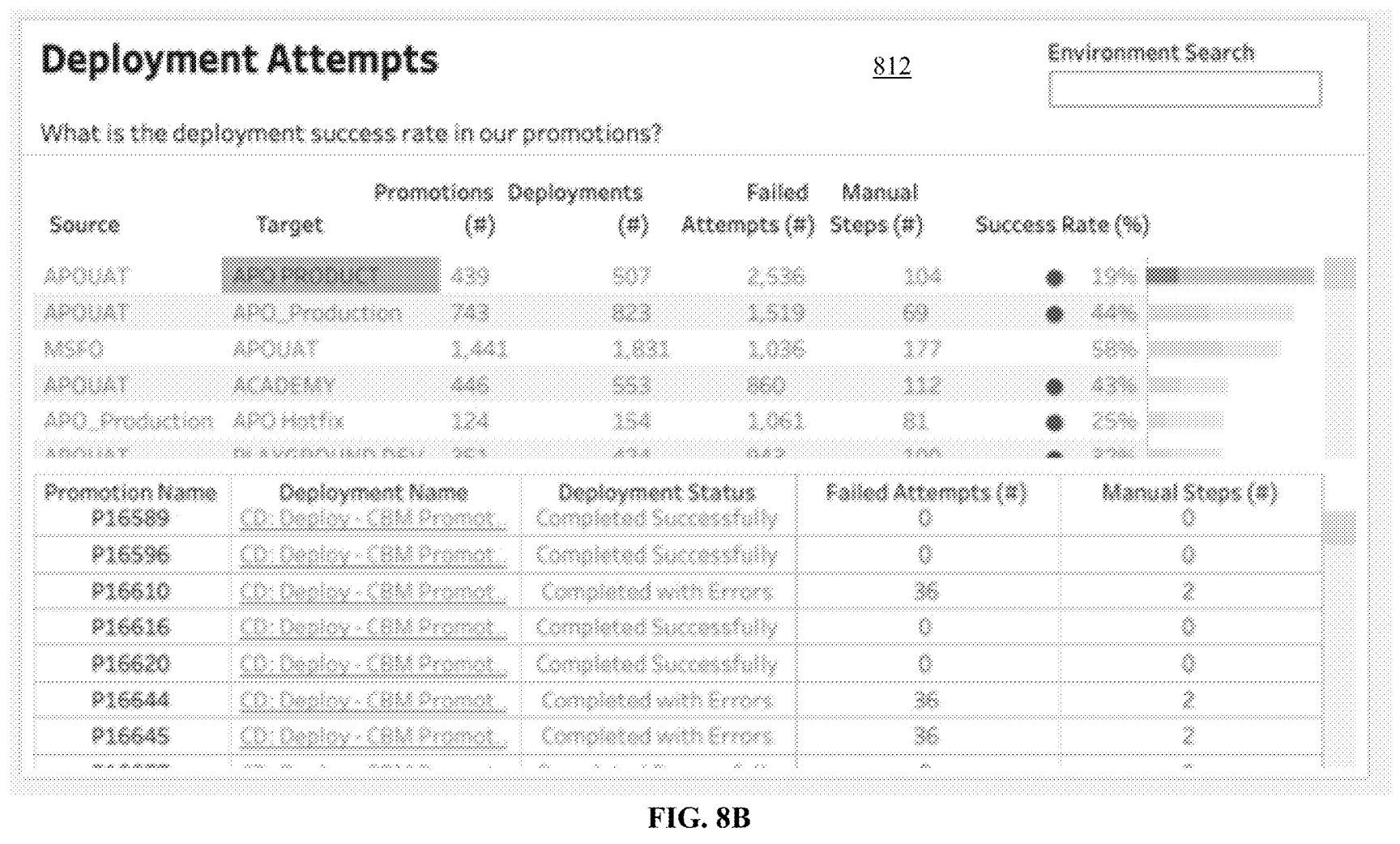

Referring to FIGS. 8A-B, screenshots of an exemplary deployment dashboard 800 are illustrated. The deployment dashboard 800 in this example illustrates metrics regarding deployments and promotions. The KPIs included in this dashboard show data from the past thirty days, although other time periods can be used in other examples. At the top of the deployment dashboard 800, KPIs including the number of promotions 802, the lead time (days) 804, the average deployment attempts per promotion 806, and the average metadata items per promotion 808 are provided.

The deployment complexity graph 810 shows the complexity of deployments and promotions. Each bubble in the deployment complexity graph 810 represents a promotion. Optionally, colors of the bubbles can correlate to the number of deployment attempts related to the promotion such that darker colors reflect higher numbers of attempts. The size of the bubbles is based on the number of manual steps in this example such that larger size corresponds with a larger the number of manual steps involved in a deployment. The Y axis of the deployment complexity graph 810 indicates the number of metadata components and the reflected data can be filtered by production environment in this example.

The deployment attempts chart 812 shows detailed information about environments and associated promotions including unique combinations of source and destination environments and an aggregation of the number of promotions, deployments, failed attempts, and manual steps. The deployment attempts chart 812 also displays an overall success rate per combination of environments based on the number of deployment attempts. The success rate can help identify problem areas in a deployment process. Selecting within the promotion column can display a URL link to the deployments associated with the promotions.

Accordingly, the deployment attempts chart 812 includes metrics on the frequency of deployments, size of deployments, the number of accompanying manual steps, and the success rates of the deployments. Failed attempts are determines based on deployment history records. Each failed attempt is identified at the step level. In some examples, failed attempts per deployment are aggregated up to the promotion. Based on the unique source and target environments, a total number of failed attempts can be provided across promotions and deployments in these examples.

Additionally, manual steps are determines based on the deployment steps that are associated with each deployment.

Referring back to FIG. 4, subsequent to embedding the populated dashboards in step 408, or if the analytics apparatus 102 determines in step 402 that an analytics request has not been received and the No branch is taken, then the analytics apparatus 102 proceeds back to step 402 and waits for an initial or subsequent analytics request from one of the client devices 116. In other examples, one or more of the steps illustrated in FIG. 4 can be performed in parallel and/or in a different order.

Accordingly, as described and illustrated herein, this technology facilitates improved software development lifecycle activity tracking, analytics, and visualizations. This technology advantageously visualizes data related to software development and operations and embeds those visualizations in the same system of software development platform used to track the data. With this technology, a round-trip flow of data can be provided that leverages external platforms optimized for ETL, data storage and processing, and data visualization. Accordingly, this technology improves software development lifecycle analysis and monitoring as well as the functionality of software development platform devices.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for providing software development analytics, the method implemented by an analytics apparatus and comprising:
provisioning an analytics application in an instance of a software development platform, wherein the analytics application comprises a schema, one or more functions, and one or more dashboard templates;
extracting according to the schema raw analytics data logged by the software development platform in one or more databases, wherein the raw analytics data is based on monitored activity associated with a software development process performed on the software development platform;
applying the one or more functions to the extracted raw analytics data to generate performance metrics for the software development process;
populating the one or more dashboard templates based on the performance metrics and embedding the populated one or more dashboard templates into a user interface of the software development platform to facilitate visualization of the raw analytics data; and
subsequent to authentication of a user identifier in response to receipt of a request for analytics from a client device, (1) generating a unique organization identifier for an organization associated with the instance, (2) initiating the extraction of the analytics data, and (3) storing in a data warehouse the extracted analytics data keyed by the generated unique organization identifier, wherein the request for analytics is initiated via the user interface.

2. The method as set forth in claim 1, wherein the analytics data comprises one or more of continuous delivery or continuous deployment (CI/CD) data, source control repository data, or project management data and comprises lifecycle data associated with a plurality of stages of a development lifecycle of the software development process.

3. The method as set forth in claim 1, wherein the populated one or more dashboard templates comprise one or more visualizations of the performance metrics associated with movement of metadata files through a continuous delivery or continuous deployment (CI/CD) pipeline and a plurality of environments including development and production environments.

4. The method as set forth in claim 1, wherein the populated one or more dashboard templates comprise one or more of an overview, planning, development, or deployment dashboard.

5. A method for providing software development analytics, the method implemented by an analytics apparatus and comprising:
provisioning an analytics application in an instance of a software development platform, wherein the analytics application comprises a schema, one or more functions, and one or more dashboard templates;
extracting according to the schema raw analytics data logged by the software development platform in one or more databases, wherein the raw analytics data is based on monitored activity associated with a software development process performed on the software development platform;
applying the one or more functions to the extracted raw analytics data to generate performance metrics for the software development process;
populating the one or more dashboard templates based on the performance metrics and embedding the populated one or more dashboard templates into a user interface of the software development platform to facilitate visualization of the raw analytics data; and
sending, by the analytics application, the schema to an extract, transform, and load (ETL) platform, the one or more functions to a data warehouse platform, and the one or more dashboard templates to a visualization platform, wherein the analytics data is extracted by the ETL platform, the one or more functions are applied by the data warehouse platform, and the one or more dashboard templates are populated by the visualization platform.

6. The method as set forth in claim 5, further comprising, subsequent to authentication of a user identifier in response to receipt of a request for analytics from a client device:
generating a unique organization identifier for an organization associated with the instance;
initiating the extraction of the analytics data; and
storing in a data warehouse the extracted analytics data keyed by the generated unique organization identifier, wherein the request for analytics is initiated via the user interface.

7. A non-transitory computer readable medium having stored thereon instructions for providing software development analytics comprising executable code that, when executed by one or more processors, causes the one or more processors to:
provision an analytics application in an instance of a software development platform, wherein the analytics application comprises a schema, one or more functions, and one or more dashboard templates;

extract according to the schema raw analytics data logged by the software development platform in one or more databases, wherein the raw analytics data is based on monitored activity associated with a software development process performed on the software development platform;

apply the one or more functions to the extracted raw analytics data to generate performance metrics for the software development process;

populate the one or more dashboard templates based on the performance metrics and embed the populated one or more dashboard templates into a user interface of the software development platform to facilitate visualization of the raw analytics data; and subsequent to authentication of a user identifier in response to receipt of a request for analytics from a client device, (1) generate a unique organization identifier for an organization associated with the instance, (2) initiate the extraction of the analytics data, and (3) store in a data warehouse the extracted analytics data keyed by the generated unique organization identifier, wherein the request for analytics is initiated via the user interface.

8. The non-transitory computer readable medium as set forth in claim 7, wherein the analytics data comprises one or more of continuous delivery or continuous deployment (CI/CD) data, source control repository data, or project management data and comprises lifecycle data associated with a plurality of stages of a development lifecycle of the software development process.

9. The non-transitory computer readable medium as set forth in claim 7, wherein the populated one or more dashboard templates comprise one or more visualizations of the performance metrics associated with movement of metadata files through a continuous delivery or continuous deployment (CI/CD) pipeline and a plurality of environments including development and production environments.

10. The non-transitory computer readable medium as set forth in claim 7, wherein the populated one or more dashboard templates comprise one or more of an overview, planning, development, or deployment dashboard.

11. A non-transitory computer readable medium having stored thereon instructions for providing software development analytics comprising executable code that, when executed by one or more processors, causes the one or more processors to:

provision an analytics application in an instance of a software development platform, wherein the analytics application comprises a schema, one or more functions, and one or more dashboard templates;

extract according to the schema raw analytics data logged by the software development platform in one or more databases, wherein the raw analytics data is based on monitored activity associated with a software development process performed on the software development platform;

apply the one or more functions to the extracted raw analytics data to generate performance metrics for the software development process;

populate the one or more dashboard templates based on the performance metrics and embed the populated one or more dashboard templates into a user interface of the software development platform to facilitate visualization of the raw analytics data; and send, by the analytics application, the schema to an extract, transform, and load (ETL) platform, the one or more functions to a data warehouse platform, and the one or more dashboard templates to a visualization platform, wherein the analytics data is extracted by the ETL platform, the one or more functions are applied by the data warehouse platform, and the one or more dashboard templates are populated by the visualization platform.

12. The non-transitory computer readable medium as set forth in claim 11, wherein the executable code, when executed by the one or more processors, further causes the one or more processors to, subsequent to authentication of a user identifier in response to receipt of a request for analytics from a client device:

generate a unique organization identifier for an organization associated with the instance;

initiate the extraction of the analytics data; and store in a data warehouse the extracted analytics data keyed by the generated unique organization identifier, wherein the request for analytics is initiated via the user interface.

13. A computing device, comprising memory comprising programmed instructions stored thereon and one or more processors configured to execute the stored programmed instructions to:

provision an analytics application in an instance of a software development platform, wherein the analytics application comprises a schema, one or more functions, and one or more dashboard templates;

extract according to the schema raw analytics data logged by the software development platform in one or more databases, wherein the raw analytics data is based on monitored activity associated with a software development process performed on the software development platform;

apply the one or more functions to the extracted raw analytics data to generate performance metrics for the software development process;

populate the one or more dashboard templates based on the performance metrics and embed the populated one or more dashboard templates into a user interface of the software development platform to facilitate visualization of the raw analytics data; and subsequent to authentication of a user identifier in response to receipt of a request for analytics from a client device, (1) generate a unique organization identifier for an organization associated with the instance, (2) initiate the extraction of the analytics data, and (3) store in a data warehouse the extracted analytics data keyed by the generated unique organization identifier, wherein the request for analytics is initiated via the user interface.

14. A computing device comprising memory comprising programmed instructions stored thereon and one or more processors configured to execute the stored programmed instructions to:

provision an analytics application in an instance of a software development platform, wherein the analytics application comprises a schema, one or more functions, and one or more dashboard templates;

extract according to the schema raw analytics data logged by the software development platform in one or more databases, wherein the raw analytics data is based on monitored activity associated with a software development process performed on the software development platform;

apply the one or more functions to the extracted raw analytics data to generate performance metrics for the software development process;

populate the one or more dashboard templates based on the performance metrics and embed the populated one or more dashboard templates into a user interface of the software development platform to facilitate visualization of the raw analytics data; and send, by the analytics application, the schema to an extract, transform, and load (ETL) platform, the one or more functions to a data warehouse platform, and the one or more dashboard templates to a visualization platform, wherein the analytics data is extracted by the ETL platform, the one or more functions are applied by the data warehouse platform, and the one or more dashboard templates are populated by the visualization platform.

15. The computing device as set forth in claim 14, wherein the analytics data comprises one or more of continuous delivery or continuous deployment (CI/CD) data, source control repository data, or project management data and comprises lifecycle data associated with a plurality of stages of a development lifecycle of the software development process.

16. The computing device as set forth in claim 14, wherein the one or more processors are further configured to execute the stored programmed instructions to, subsequent to authentication of a user identifier in response to receipt of a request for analytics from a client device:

generate a unique organization identifier for an organization associated with the instance;

initiate the extraction of the analytics data; and store in a data warehouse the extracted analytics data keyed by the generated unique organization identifier, wherein the request for analytics is initiated via the user interface.

17. The computing device as set forth in claim 14, wherein the populated one or more dashboard templates comprise one or more visualizations of the performance metrics associated with movement of metadata files through a continuous delivery or continuous deployment (CI/CD) pipeline and a plurality of environments including development and production environments.

18. The computing device as set forth in claim 14, wherein the populated one or more dashboard templates comprise one or more of an overview, planning, development, or deployment dashboard.

\* \* \* \* \*